(12) United States Patent
Gower

(10) Patent No.: US 8,393,055 B2
(45) Date of Patent: Mar. 12, 2013

(54) TRACK MOUNT FOR FLEXIBLE IMPACT RESISTANT ENCLOSURE

(76) Inventor: Ted Gower, N. Palm Beach, FL (US)

( * ) Notice: Subject to any disclaimer, the term of this patent is extended or adjusted under 35 U.S.C. 154(b) by 508 days.

(21) Appl. No.: 10/779,000

(22) Filed: Feb. 13, 2004

(65) Prior Publication Data

US 2004/0159345 A1 Aug. 19, 2004

Related U.S. Application Data

(63) Continuation-in-part of application No. 10/446,006, filed on May 22, 2003, now abandoned, which is a continuation-in-part of application No. 09/565,211, filed on May 4, 2000, now Pat. No. 6,325,085, which is a continuation of application No. 09/270,249, filed on Mar. 15, 1999, now Pat. No. 6,176,050, which is a continuation-in-part of application No. 08/861,209, filed on May 21, 1997, now abandoned.

(51) Int. Cl.
*A47H 15/00* (2006.01)
*E05D 15/00* (2006.01)

(52) U.S. Cl. ......... 16/95 D; 16/94 R; 16/95 R; 16/96 R

(58) Field of Classification Search ................. 16/196.1, 16/199, 327, 330, 94 R, 96 R, 87.2, 90, 87.4 R, 16/93 D, 95 R; 160/196.1, 118, 123, 201, 160/345; 135/125, 117, 120.3; 52/222; 248/223.41, 224.61, 298.1; 104/89, 106, 104/110, 111; 49/409, 411

See application file for complete search history.

(56) References Cited

U.S. PATENT DOCUMENTS

| | | | | |
|---|---|---|---|---|
| 1,339,247 A * | 5/1920 | Wilson | ............................. | 16/87.8 |
| 2,648,869 A * | 8/1953 | French et al. | ................. | 16/93 D |
| 2,727,272 A * | 12/1955 | Hankin et al. | ................ | 16/93 D |
| 2,761,150 A * | 9/1956 | Kellogg | ............................. | 4/558 |
| 3,090,431 A * | 5/1963 | Stubblefield | ................... | 160/345 |
| 3,192,994 A * | 7/1965 | Graber et al. | ................. | 160/345 |
| 3,248,749 A * | 5/1966 | Williams | ....................... | 16/93 D |
| 3,644,962 A * | 2/1972 | Hachtel | ......................... | 16/96 D |
| 3,703,740 A * | 11/1972 | Mann et al. | .................... | 16/87.2 |
| 3,772,734 A * | 11/1973 | Kimel | ............................. | 16/87.2 |
| 3,805,816 A | 4/1974 | Nolte | | |
| 3,862,876 A | 1/1975 | Graves | | |
| 3,883,924 A * | 5/1975 | Grabman | ....................... | 16/94 D |
| 3,949,527 A | 4/1976 | Double et al. | | |
| 4,124,918 A * | 11/1978 | Cummings | .................... | 16/93 D |
| 4,168,667 A * | 9/1979 | Loomis | .......................... | 410/118 |
| 4,190,927 A * | 3/1980 | Hepperle | ....................... | 16/96 D |
| 4,283,888 A | 8/1981 | Cros | | |
| 4,397,122 A | 8/1983 | Cros | | |
| 4,581,788 A * | 4/1986 | Baumann | ....................... | 16/93 D |
| 4,582,109 A * | 4/1986 | Fairbanks | ................... | 160/84.04 |
| 4,590,714 A | 5/1986 | Walker | | |
| 4,775,127 A * | 10/1988 | Nakamura | ..................... | 248/489 |
| 4,858,395 A | 8/1989 | McQuirk | | |
| 4,947,561 A * | 8/1990 | Delacroix et al. | .......... | 38/102.91 |
| 5,240,213 A * | 8/1993 | Horcher | ................... | 248/223.41 |
| 5,339,884 A * | 8/1994 | Angerman | ..................... | 160/330 |
| 5,347,768 A | 9/1994 | Pineda | | |
| 5,522,184 A | 6/1996 | Oviedo-Reyes | | |
| 5,540,171 A * | 7/1996 | Monahan | ....................... | 114/204 |
| 5,579,794 A | 12/1996 | Sporta | | |
| 5,794,400 A * | 8/1998 | Fisher et al. | ................. | 52/731.2 |
| 5,857,511 A * | 1/1999 | Judkins | ......................... | 160/348 |

(Continued)

*Primary Examiner* — Jack W. Lavinder
*Assistant Examiner* — Emily Morgan
(74) *Attorney, Agent, or Firm* — Cuenot, Forsythe & Kim, LLC

(57) ABSTRACT

A flexible fabric barrier may be formed to provide an enclosure for buildings and other structures to protect the structures from the effects of windstorms. The barrier is mounted to the building or structure by a track system that has a cleat with an elongated channel. A series of slides are dimensioned to move within the channel about turns in the channel and under side loads. Each of the slides has a D-ring slidably mounted thereon. The D-ring is connected to the barrier. The barrier may be stacked in a folded position with the slides in close proximity with each other and deployed by moving the slides along the channel to form an enclosure.

14 Claims, 4 Drawing Sheets

U.S. PATENT DOCUMENTS

| | | | |
|---|---|---|---|
| 5,881,650 A * | 3/1999 | Gersemsky et al. | 105/154 |
| 6,131,243 A * | 10/2000 | Lee | 16/87.2 |
| 6,223,389 B1 * | 5/2001 | Walsh et al. | 16/87.4 R |
| 6,325,085 B1 * | 12/2001 | Gower | 135/90 |
| 6,412,540 B2 | 7/2002 | Hendee | |
| 6,675,980 B2 * | 1/2004 | Ehrgott | 211/189 |
| 7,805,897 B2 * | 10/2010 | Holland et al. | 52/202 |
| 2009/0193730 A1 * | 8/2009 | Pruet et al. | 52/222 |

* cited by examiner

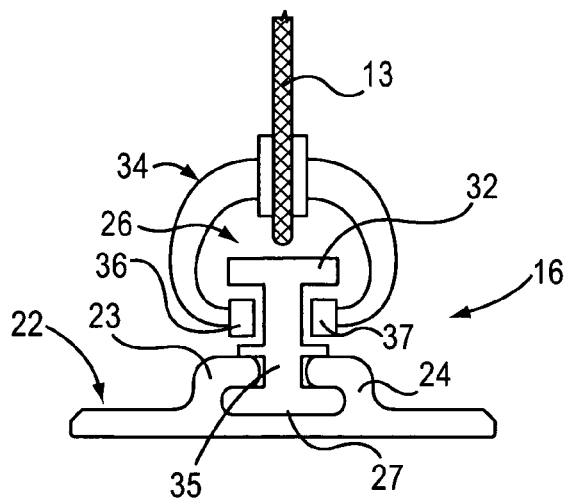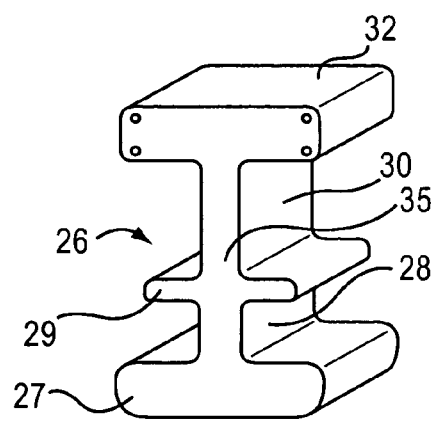
FIG.3   FIG.4
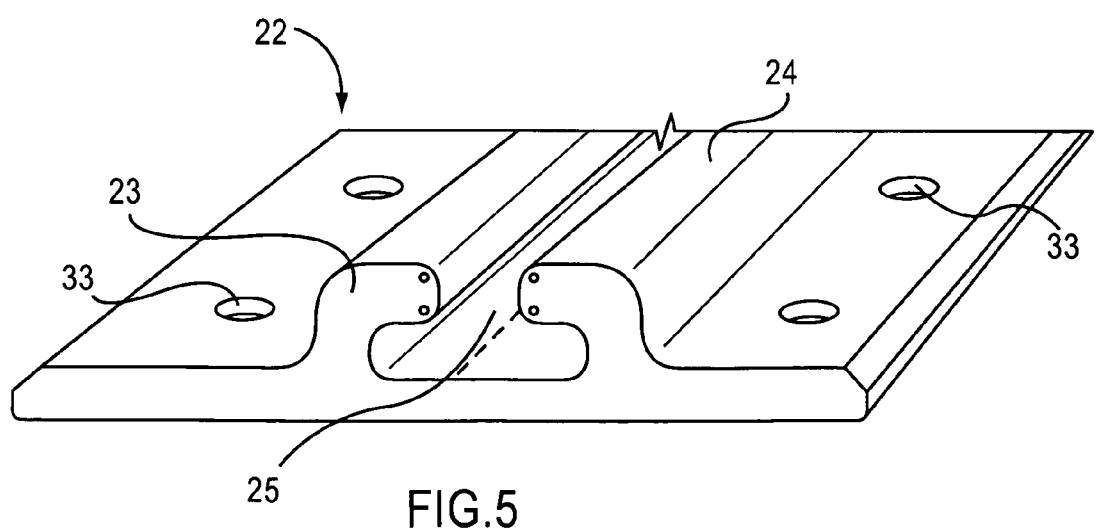
FIG.5

TRACK MOUNT FOR FLEXIBLE IMPACT RESISTANT ENCLOSURE

CROSS REFERENCE TO RELATED APPLICATIONS

This application is a continuation-in-part of U.S. patent application, Ser. No. 10/446,006, filed May 22, 2003 now abandoned, which is a continuation-in-part of Ser. No. 09/565,211, filed May 4, 2000 now U.S. Pat. No. 6,325,085, which is a continuation of Ser. No. 09/270,249, filed Mar. 15, 1999, now U.S. Pat. No. 6,176,050, issued Jan. 23, 2001, which is a continuation-in-part of Ser. No. 08/861,209, filed May 21, 1997 and now abandoned. The content of the prior applications and the prior art cited in each of these applications is incorporated herein by reference.

FIELD OF THE INVENTION

This invention is related to flexible barriers used to protect buildings from the damaging effects of wind storms. In particular, the invention is directed to the mounting apparatus that attaches the barrier to the building and/or the ground.

BACKGROUND OF THE INVENTION

Hurricane shutters are well known in the art and are usually made from a rigid material such as aluminum or wood and sometimes plastic. These devices are expensive to purchase, cumbersome and heavy. Further, these shutters prevent visibility either in or out of the building. These shutters are manufactured and installed to provide the protection required by the building codes of particular geographic areas. The building codes are based on standardized testing to meet certain standards of strength and integrity.

The prior art also teaches the use of knitted or woven fabrics such as tarpaulins, drop cloths, blankets and netting for securing smaller vehicles and objects against high winds. Such fabric devices are shown in the following patents, U.S. Pat. No. 3,862,876; U.S. Pat. No. 4,283,888; U.S. Pat. No. 4,397,122; U.S. Pat. No. 4,858,395; U.S. Pat. No. 3,949,527; U.S. Pat. No. 3,805,816; U.S. Pat. No. 5,522,184; U.S. Pat. No. 4,590,714; and U.S. Pat. No. 5,347,768. The Sporta patent, U.S. Pat. No. 5,579,794, is typical of these fabric type protection devices. The patent discloses a porous fabric that extends downwardly and outwardly from the top of the building to be protected at an acute angle so as to surround a substantial portion of each of the sides with an inclined wind permeable planter surface. The device is disclosed as fifty percent to ninety percent open. Any reduction in wind reaching the covered structure will be slight because of this porosity. The device may be somewhat effective in reducing damage caused by the impact of some debris.

The prior art does not show a convenient and easy mechanism for storing the flexible wind barriers so that they may be deployed quickly and easily.

This patent is related to Ser. No. 10/033,030 filed Nov. 9, 2001 the contents of which are incorporated by reference.

Thus, what is lacking in the art is a flexible protective barrier constructed from a mesh material that can be easily stored and deployed for protecting the frangible portions of a structure from not only objects carried by the wind but also the force of the wind itself.

SUMMARY OF THE INVENTION

Therefore it is an objective of this invention to teach the use of a reasonably transparent flexible barrier of woven synthetic textile that is able to satisfy stringent building codes.

It is another objective of this invention to teach the use of a mounting apparatus to attach the flexible textile material to a building so that the fabric may be stored and deployed easily.

It is a further objective of this invention to provide a track to be attached to a building or the ground to capture one edge of the fabric barrier.

It is yet another objective of this invention to provide a slide which cooperates with the track for storage and deployment of the fabric barrier.

It is a further objective of this invention to provide a connector that cooperates with this slide and is fastened to the edge of the fabric barrier.

Still another objective is to provide a track that allows for ease of track bending during installation.

Another objective is to provide a track that is self aligning when coupling to multiple tracks.

Still another objective is to provide a mounting device that can be color coded, anodized or otherwise painted to match the installation area.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 3 is a side view of the flexible barrier, the track, the slide, and the connector of this invention;

FIG. 4 is a perspective of the slide of this invention;

FIG. 5 is a perspective of the track of this invention;

DETAILED DESCRIPTION OF THE PREFERRED EMBODIMENT

Figure 1:
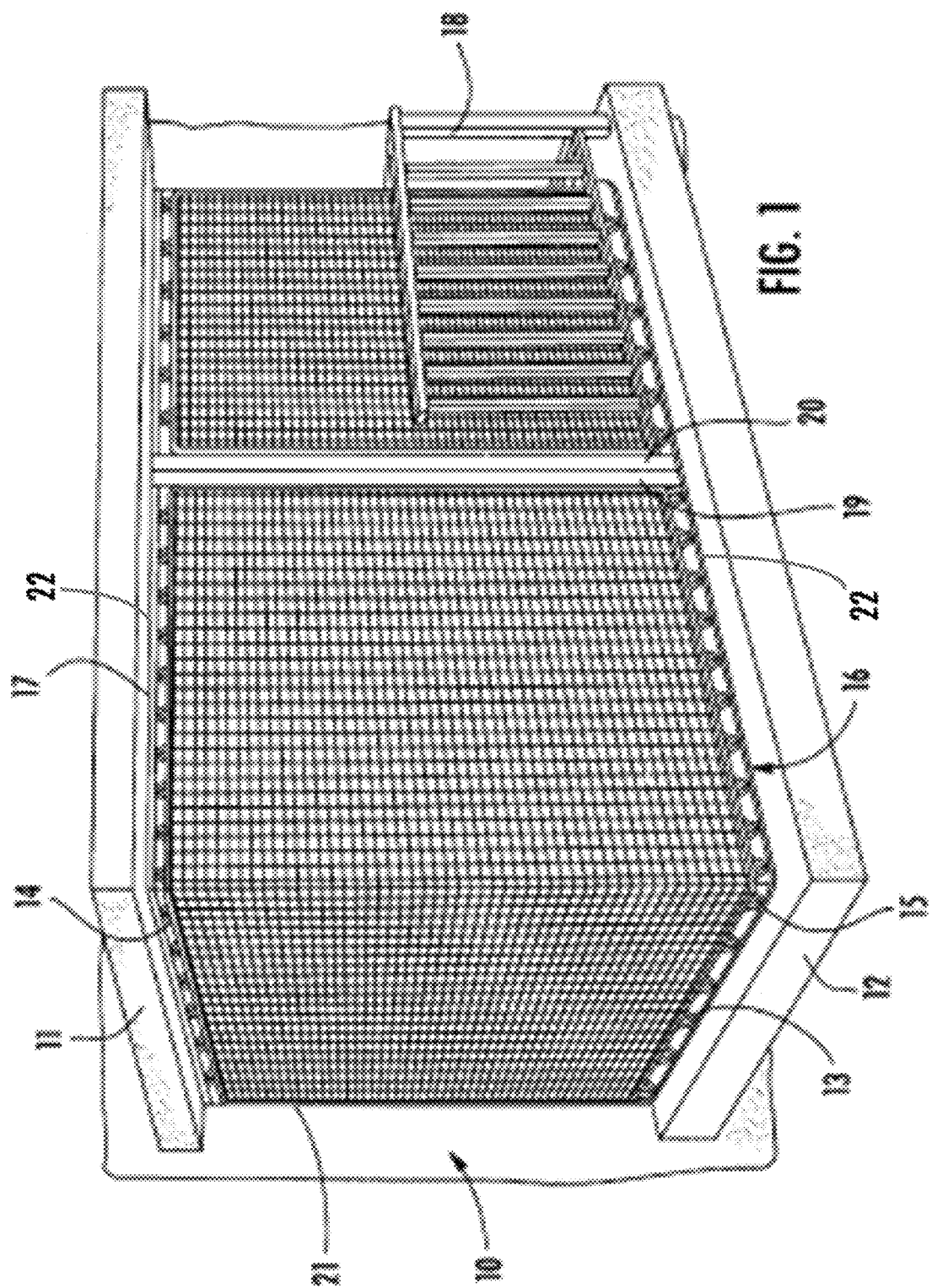
FIG. 1 is a perspective view of a balcony with the fabric barrier and track of this invention deployed.

FIG. 1 illustrates a balcony attached to a larger building with a flexible impact resistant enclosure 10 deployed to protect the windows and door onto the balcony. The balcony can be exposed to the environment outside of the larger building. The flexible impact resistant enclosure 10 extends from the balcony roof 11 to the floor 12 and continuously about the periphery of the balcony inside the guard rail 18.

As shown, the enclosure 10 has a flexible barrier 13 extending between the tracks 16, attached to the floor 12, and the track 17, attached to the roof 11. The flexible barrier 13 has two sections connected together by fasteners 19 and 20. The fasteners reinforce the connection between the free edges of the sections and may include a lock for security. The fasteners 19 and 20 allow each section to be deployed or stored individually. The opposite edges of the sections are attached to the building by anchors or channels 21 to prevent damaging winds penetrating the enclosure. Of course the flexible barrier 13 may be a unitary construction with either edge connected to the building to permit storage and secure deployment.

The tracks 16 and 17 are oriented so that the flexible barrier 13 is disposed perpendicularly to the roof 11 and the floor 12. Depending on the construction of the building or house, the barrier 13 may form an angle other than 90° with the roof and the floor. Also, only one track may be used with the other edge of the barrier attached to the floor, eaves, patio, sidewalk, or ground by individual anchors.

Figure 2:
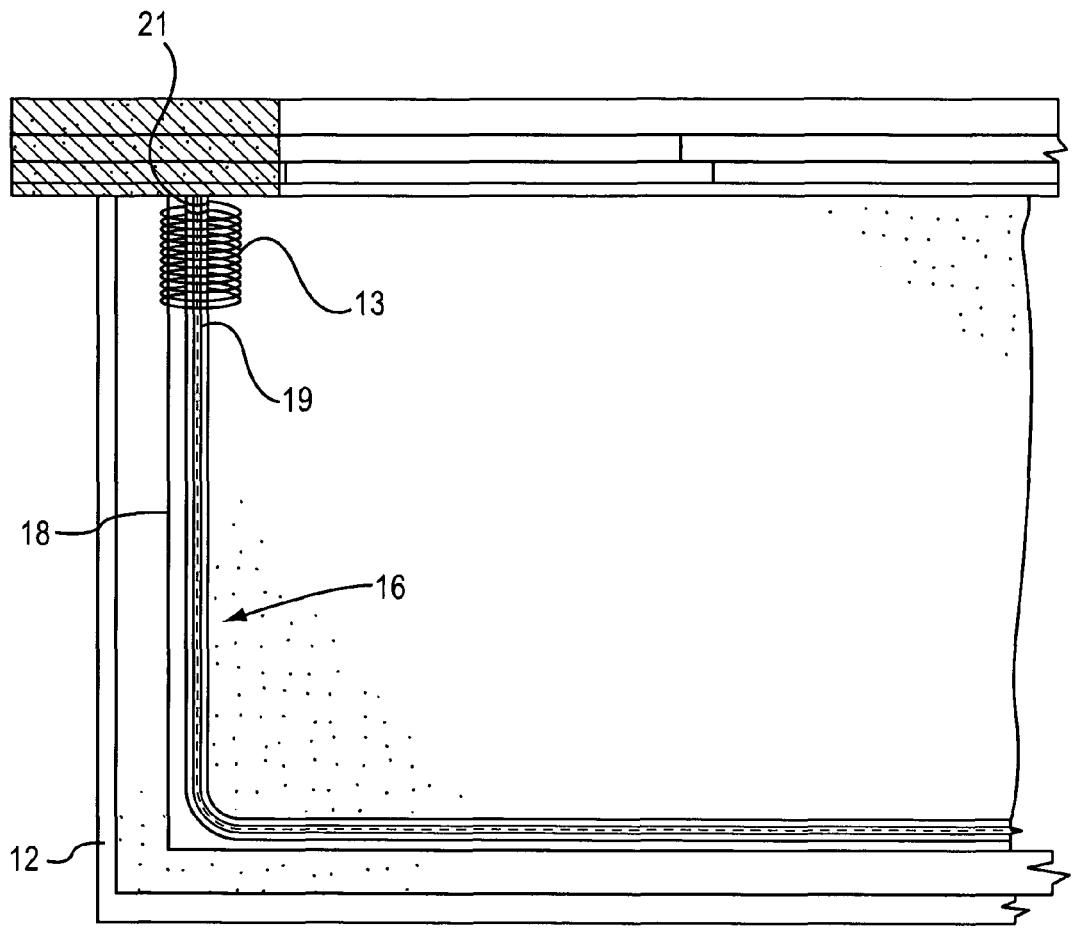
FIG. 2 is a top plan view of the balcony illustrated in FIG. 1.

FIG. 2 shows the floor 12 of the balcony, a portion of the guard rail 18, the track 16 and the stacked barrier 13. In the preferred embodiment, the stacked barrier 13 requires approximately four percent of the total opening. Also, the track 16 is configured in a 90° horizontal turn to follow the periphery of the balcony.

The barrier 13 is made from textile woven fiber, such as polypropylene, manufactured by Sythenic Industries of Gainsville, Ga. as Geotextile Style 20458. The interstice size is approximately 0.6 mm. The barrier must meet certain criteria of strength, such as stated in the Miami-Dade County, Florida building code which is becoming a standard in the wind storm protection industry. These criteria, together with this size of the span covered by the barrier, constitute the basis for calculating the spacing of the barrier from the object to be protected. The fabric of the barrier 13 is known to stretch a maximum of 21% prior to failure and requires a force of 675 lbs. psi to fail. In contrast the Dade County building code requires that a barrier must withstand a force of only 61.3 psi. The percentage of stretch at failure is used to calculate the minimum space between the barrier and the structure to be protected. The formula may be stated as test load divided by maximum load times the percent stretch at maximum load equals stretch factor. These numbers are 61.3÷675×21=1.9%. Therefore, if the distance between two fastened sides of the barrier 13 is 8' the stretch measurement will be 96"×1.9%=1.83".

To calculate the deflection of the barrier under load, right triangles are used such that the hypothenuse is one-half of the sum of the height plus stretch (97.83÷2=48.92"). The known side is one-half of the height (96÷2=48). Thus, the deflection equals the square root of the difference between the square of the hypothenuse less the square of the known side. This result is 9.4" which is the maximum deflection on impact by a test missile. Thus, to meet the prescribed standard the barrier must be mounted so as to be spaced at least 9.4" from the surface to be protected if an 8' span is to be used. A longer span will require a wider spacing, a shorter span will require less spacing. The table shown below reflects the spacing for various sample distances of span with this preferred fabric 13.

Table demonstrating relationship between Span and Maximum Deflection in the Preferred Embodiment as Described Above.

| Height | Deflection |
| --- | --- |
| 8 feet | 9.4 inches |
| 10 feet | 11/8 inches |
| 12 feet | 14.1 inches |
| 14 feet | 16.5 inches |
| 16 feet | 18.8 inches |
| 18 feet | 21.2 inches |
| 20 feet | 23.5 inches |
| 22 feet | 25.9 inches |
| 24 feet | 28.2 inches |
| 30 feet | 35.2 inches |
| 40 feet | 47.0 inches |

The deflection shown in the table is intended to be a minimum therefore, the spacing between the barrier and the building should include an additional factor, particularly to allow for maximum wind pressure. Assuming 115 mph wind at 90° to the barrier an additional pressure on the barrier will be 0.237 lbs per linear inch of span. The additional pressure can be resolved into a vector and added directly to the test force of 61.3 lbs. Thus an 8' barrier will have an additional 22.75 lbs added for a total of 84.05 lbs. For example, an 8' barrier could deflect 10.9" on allowing for a 115 mph wind factor rather than 9.7" if the wind was not factored in.

Once the minimum space between the barrier and the structure being protected has been established the fabric must be anchored in a suitable manner so as to absorb the loads without being torn from its support.

The tracks 16 and 17, shown in FIG. 1, are identical and are composed of an elongated cleat 22 having a planar base on one side and an elongated channel 25 on the other side. The channel 25 is formed by opposite upstanding walls 23 and 24 which are curved toward each other but do not meet, producing an oval channel with a narrower open slot, shown in FIGS. 3 and 5-7. The upstanding walls 23 and 24 are spaced inwardly from the longitudinal edges of the cleat leaving a flange on each side of the channel 25. Apertures 33 are located in the flanges, approximately on 2' centers, along the length. The apertures 33 accept bolts or anchors to attach the cleat to the supporting surface. For instance, the cleats 22 can be attached to one or more surfaces of a balcony. In one embodiment, the cleat 22 of track 17 can be attached to the balcony roof 11, and the cleat 22 of track 16 can be attached to the balcony floor 12, as is shown in FIG. 1. As a result, it will be appreciated that the cleats 22 are exposed to the environment outside of the building to which the balcony is attached. The cleats 22 require approximately a 12" radius to bend 90° horizontally. The preferred material is 6005-T5 extruded aluminum coated with Kinar, though other materials may be used.

Figure 6:
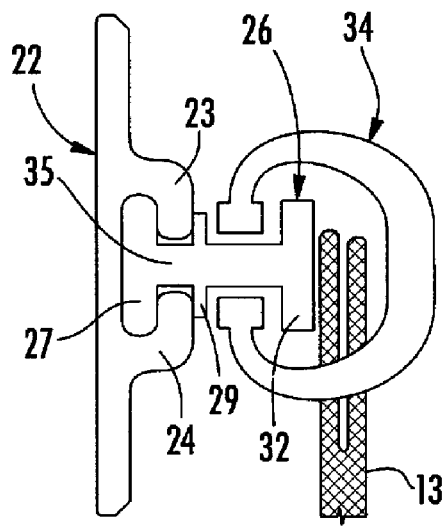
FIG. 6 is a side view of the track mounted on a vertical wall.

As shown in FIG. 1, the tracks 16 and 17 are mounted with the open channel 25 facing each other, one above the other. The tracks may be mounted with the open channels facing each other along the lateral sides of the barrier 13. The cleats 22 may also be mounted with the open channel 25 parallel or perpendicular to each other as shown in FIG. 6.

Figure 8:
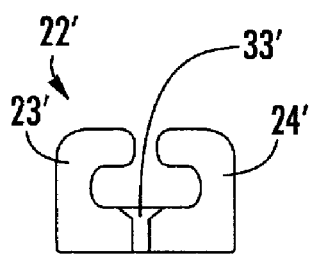
FIG. 8 is a side view of another embodiment of the track of this invention.

Another embodiment of the cleat is shown in FIG. 8. The lateral flanges are omitted and the apertures 33' are located between the upstanding walls 23' and 24'.

Figure 7:
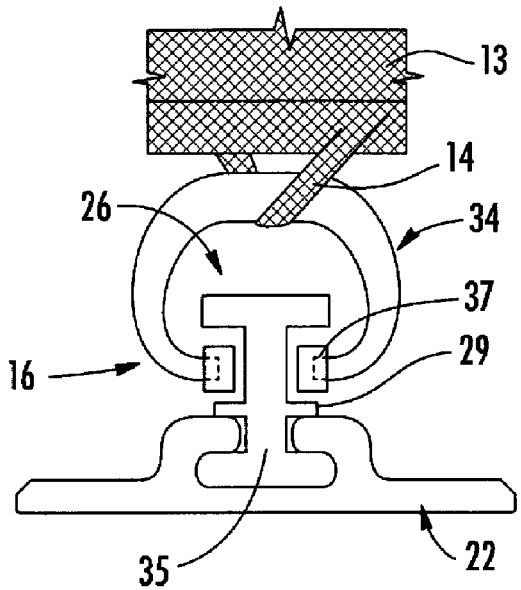
FIG. 7 is an another embodiment of the connection between the fabric and the track of this invention.

The slides 26 have a central shaft 35 with a wider oval foot 27 on one end. The foot 27 is dimensioned to slide in the channel 25. The shaft 35 slides on the open slot of the channel 25, as shown in FIGS. 3, 6 and 7. The shaft 35 has a lower groove 28 between the foot 27 and the wing 29 dimensioned to substantially fill the slot in the channel 25. The wing 29 and groove 28 serve to guide the movement of the slide along the length of the cleat 22.

The other end of the shaft 35 has a flange 32. The flange 32 and the wing 29 form an upper groove 30. The slides 26 are dimensioned to freely slide in the cleats under a twisting side load. They are approximately 1.5" in length but may vary with the installation. The slides may be made of the same material as the cleats 22 but a preferred material is ultra high molecular weight polyethylene (UHMV-PE). Other polymers may be used or combinations of polymers or combinations of polymers and metals.

Figure 9:
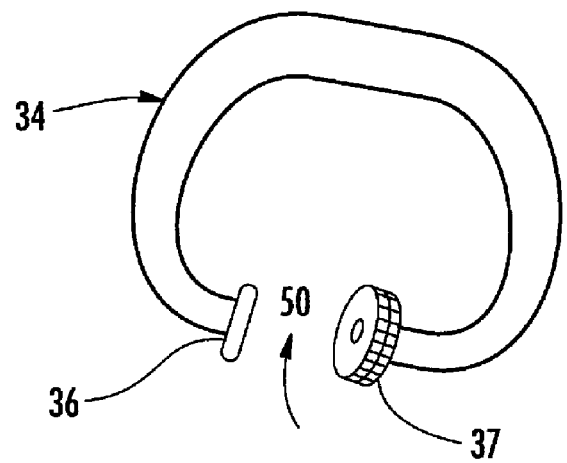
FIG. 9 is a perspective of the connector of this invention.

The D-ring 34 may be made of forged stainless steel or similar material. The staff of the D-ring is interrupted leaving a gap 50 of suitable dimensions to fit within the groove 30. The opposed ends of the gap 50 have a nylon roller which slides in the groove 30. Another embodiment has a polymeric coating on the ends to facilitate sliding along the groove 30. In FIG. 9 a D-ring 34 is shown with a plastic roller 37 on one end of the gap 50 and a polymeric slide 36 on the other end of the interrupted staff. When in use the circumference of the roller would engage the guide 29 and the flange 32. In FIGS. 1 and 7 the D-ring is illustrated as having a butterfly connection 14 between the D-ring and the reinforced selvage of the fabric barrier 13. In FIG. 6 the D-ring is shown connected to a reinforced hem of the fabric 13 and in FIG. 3 the D-ring is attached to the fabric 13 through a grommet.

In operation the flexible impact resistant enclosure may be used for privacy and sun screen purposes, as well as windstorm protection. In the enclosure shown in FIG. 1 either section of the enclosure could be deployed with the other section in the folded position. The flexible impact resistant fabric 13 may be deployed by simply pulling the sections together and fastening and closing the fasteners 19 and 20. Once the sections are closed and the flexible impact resistance enclosure is formed, the enclosure can withstand winds of at least 115 mph.

In an alternative embodiment, the flexible impact resistant fabric is not spaced from the glass, door, opening, or wall to be protected. This embodiment would provide similar protection to impact glass, wherein glass breakage does not cause the envelope to fail. Repair of impact gall is very expensive and time consuming since off-site sizing is typically required. However, repair of conventional glass is inexpensive and sizing of replacement windows can be easily be performed on-site. Additionally, the flexible impact resistant fabric can be incorporated in the frame of lower priced windows, approximately eighty percent of lower priced windows are available in two sizes. This embodiment retains all of the previously mentioned benefits operating as the stand-off barrier with transparency, east of deployment and storage, rain and wind barrier. In addition, advantages over the stand-off design includes an even easier deployment due to smaller sizes, less expensive to address low price mass-reduced window markets, doors and possible wall (EIFS and such) markets. It is recognized that low priced windows have a water penetration problem, which the addition of this fabric can reduce. In this embodiment the protective barrier device protects frangible portions of a structure from the force of wind and wind born objects by use of a panel of flexible mesh material having a maximum deflection of approximately 20% before failure and air permeability of approximately 250 cfm at a wind force of 1 inch Hg. The panel is fastened to a structure by screws or the like fasteners wherein deflection of the panel will actually impact the structure. Should a weak portion of the structure fail, such as a windows, the panel will prevent excess damage to the interior by reduction of wind.

Building code standards that must be met usually considered a protective barrier to be non-porous even though a small amount of openness exits. Both ASTM and SBCCI are accepted standards for the new Florida Building Code and elsewhere. ASTM considers a barrier to be non-porous if it is less than 10% open. SBCCI has chosen 5% as the porous non-porous dividing line. The logic is that a small amount of water or air intrusion is insignificant. If the structure envelope remains intact, catastrophic damage should not occur.

In areas that accept these standards, the fabric can replace plywood used for covering of windows and openings as it can be attached by simply attaching screws through the fabric for securement to the structure. The fabric has rip-stop construction so that the screw penetration will not cause damage to the fabric.

The selection of interstice size and configuration of the fabric is dependent on the amount of transparency and air passage desired and the limitation that the maximum size must be sufficiently small to prevent objects that are potentially damaging on impact from passing therethrough. The regulations set in place by Dade County, Florida have determined that the smallest diameter missile (wind blown debris) with which they are concerned is ⅜ inch in diameter. Therefore to satisfy the Dade County Regulations the interstices must be small enough to prevent ⅜ inch diameter missiles from passing therethrough. Other regulations may set other minimum missile diameter sizes. The interstice size would similarly relate thereto if the barrier were intended to satisfy said other regulations.

The preferred embodiment is a polypropylene, woven monofilament geotextile. The individual filaments are woven into a basket weave network and calendered so that the filaments retain dimensional stability relative to each other. This geotextile is resistant to ultra violet degradation and to biological and chemical environments normally found in soils. This fabric is often used as the mat for outdoor trampolines and is intended to be very resistant to weathering. The fabric is known to stretch a maximum of 21% prior to failure and requires a force of 675 psi to fail.

The present test that was originally legislated by Dade County Florida and may become the standard in the industry, requires the barrier to withstand a force of only 61.3 psi. Consequently the fabric meets and exceeds the first requirement of strength.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

I claim:

1. A track system, comprising:
   a plurality of cleats, each cleat comprising a planar base, a plurality of apertures that accept bolts or anchors to attach the cleat to a supporting surface, and sidewalls that cooperatively define a channel;
   at least one track, the track comprising a central shaft, a first flange at a first terminal end of the central shaft, a second flange at a second terminal end of the central shaft, and a wing extending from the central shaft between the first flange and the second flange;
   at least one D-ring, the D-ring having a body that is generally D-shaped substantially enclosing a central opening that receives the second flange, the D-ring being configured to connect to a flexible barrier, an opening formed in the body such that a pair of opposed ends are formed, a portion of the central shaft being received between the opposed ends;
   wherein a portion of the central shaft, the wing and the second flange form an upper groove in each track such that the at least one D-ring is guided along each track by the upper groove; and
   wherein the track system is configured to maintain a flexible barrier to enclose an area and provide windstorm protection to that area against windblown debris.

2. The track system of claim 1, wherein the wing and the first flange are configured to form a lower groove in each track.

3. The track system of claim 1, wherein the channel is configured to receive the first flange.

4. The track system of claim 2, wherein the lower groove is configured to receive the elongated sidewalls of each elongated cleat.

5. The track system of claim 1, wherein each opposed end comprising one of a roller and a slide.

6. The track system of claim 1, wherein each D-ring comprises at least one of a butterfly connection, a grommet, and a hem connection, each configured to connect to the flexible barrier.

7. The track system of claim 1, wherein each track includes a curve.

8. The track system of claim 7, wherein each curve is about 90 degrees.

9. The track system of claim 1, wherein the channel of at least one of the plurality of cleats is oriented to open at a non-perpendicular angle relative to horizontal.

10. The track system of claim 1, wherein the cleats are made of 6005-T5 aluminum.

11. The track system of claim 1, wherein the plurality of cleats includes at least one upper cleat and at least one lower cleat, wherein the at least one upper cleat is disposed at a higher elevation than the at least one lower cleat.

12. The track system of claim 11, wherein the channel of the at least one upper cleat and the channel of the at least one lower cleat are oriented such that they open toward each other.

13. The track system of claim 11, wherein the channel of the at least one upper cleat and the channel of the at least one lower cleat are oriented such that they open substantially perpendicular to each other.

14. The track system of claim 1, wherein the track is designed to withstand the force of windstorms.

\* \* \* \* \*